United States Patent

[11] 3,586,775

[72] Inventors Edward S. Smierciak;
Wallace R. Neumann, both of Fort Wayne, Ind.
[21] Appl. No. 708,933
[22] Filed Feb. 28, 1968
[45] Patented June 22, 1971
[73] Assignee International Telephone and Telegraph Corporation
Nutley, N.J.

[54] PSEUDO-RANDOM DOT INTERLACE TELEVISION SYSTEM
9 Claims, 20 Drawing Figs.

[52] U.S. Cl. .......... 178/69.5
[51] Int. Cl. .......... H04n 1/36
[50] Field of Search .......... 178/69.5
TV, 7.5 E, 5.4, 6 BRW, 7.7, 7.5; 315/17, 19, 20, 22, 26, 27, 31

[56] References Cited
UNITED STATES PATENTS

| | | | |
|---|---|---|---|
| 2,801,278 | 12/1969 | Moore | 178/7.7 |
| 2,810,780 | 10/1957 | Loughlin | 178/7.7 |
| 2,940,005 | 6/1960 | Toulon | 178/6 (BWR) |
| 3,342,937 | 9/1967 | Deutsch | 178/69.5 (TV) |

*Primary Examiner*—Richard Murray
*Assistant Examiner*—Alfred H. Eddleman
*Attorneys*—C. Cornell Remsen, Jr., Rayson P. Morris, Percy P. Lantzy, Philip M. Bolton, Isidore Togut and Hood, Gust, Irish & Lundy

ABSTRACT: In a raster-type television system which includes a signal source generating a time based dot interlaced video signal having recurrent line synchronizing signals and frame synchronizing signals, a pseudo-random dot interlace-sampling system is provided for sampling and transmitting the sampled dot interlaced signal in a pseudo-random manner. The pseudo random dot interlace sampling system includes a source generating a train of timing signal pulses in response to the line synchronizing signals, a signal source generating a train of recurrent sampling signal pulses having a certain predetermined frequency relationship with various parameters of the system, an interlace counter for actuating the sampling signal pulse-generating source, a circuit for setting the interlace counter to a different predetermined initial count of the timing signal pulses in response to each frame-synchronizing signal, and gating circuit responsive to the sampling signal pulses for sampling and transmitting the sampled train of sequential dot interlaced video signals.

INVENTORS
EDWARD S. SMIERCIAK
WALLACE R. NEUMANN
BY Wood, Gust & Irish
ATTORNEYS INVENTORS
EDWARD S. SMIERCIAK
WALLACE R. NEUMANN
BY Wood, Herst & Irish
ATTORNEYS INVENTORS
EDWARD S. SMIERCIAK
WALLACE R. NEUMANN
BY Wood, Herron & Evans
ATTORNEYS INVENTORS
EDWARD S. SMIERCIAK
WALLACE R. NEUMANN
BY Wood, Gust & Irish
ATTORNEYS

PSEUDO-RANDOM DOT INTERLACE TELEVISION SYSTEM

BACKGROUND OF THE INVENTION

1. Field of the Invention

This invention relates generally to dot interlaced television systems, and more particularly to a pseudo-random dot interlace television system.

2. Description of the Prior Art

In conventional broadcast television, thirty complete frames are transmitted each second, each frame comprising 525 lines. With each line containing on the order of 400 picture elements, each of which can have many levels of brightness, i.e. black, grays and white, the transmission of conventional black and white television picture signals require a transmission facility having a band width of approximately four megacycles. However, from an information standpoint, this television picture contains much more information than the human eye can possibly assimilate. Thus, due to the limitations of the human eye, television pictures can be presented containing less information without severe picture quality degradation. It has been proposed, such as in U.S. Pat. No. 2,479,880 to P.M.G. Toulon, U.S. Pat. No. 3,136,847 to F. Brown, and U.S. Pat. No. 3,499,980 issued on Mar. 10, 1970 to Edward S. Smierciak, and assigned to the assignee of the present application, to reduce the bandwidth required for television signal transmission by taking advantage of the psycho-physical characteristics of the human eye. In accordance with such proposals, a normal line-television presentation is divided into a series of dots or elements, these dots being transmitted in a predetermined sequence, such as every second, fourth, eighth, sixteenth, etc. dot. By thus transmitting these dots or elements in a sequential manner, a resulting image is generated containing sufficient information for the eye, by reason of its psychophysical characteristics, to receive the entire picture.

The principle of operation of dot interlacing is essentially the same as that employed in normal television for vertical interlacing of the horizontal scanning lines, the only difference being that the interlacing now takes place in a horizontal axis rather than in the vertical axis. The requirements for horizontal back interlacing are expressed by the equation $$f_e=_v (LE)/n_1n_2.$$

The above equation defines the frequency of the dots or elements to be transmitted out of each line required for a dot interlace ratio of $n_2$.

The system and method of the aforesaid Smierciak application recognizes the fact that the only real requirement for sequential dot interlacing is that the number of elements or dots in each line be the same, subject to the above-stated requirement as to the quotient $LE/n_{n1}n_2$. Thus, in accordance with the Smierciak application, what is referred to as a "quasi" line is established which contains the exact predetermined number of interlace elements, this "quasi" line in all cases having a duration no longer than the minimum duration or interval of the usable portion of each line, i.e. between the line synchronizing signals.

In all dot interlace systems, the display on the monitor is in the form of discreet dots, rather than the lines to which the average viewer is accustomed. In prior dot interlace systems, an objectionable sensation is experienced when observing the reconstructed dot television image by reason of the apparent creeping or crawling of the dots across the face of the monitor tube. This crawling dot pattern is actually an illusion due to the time and position displacement of the dots on the screen. One system for eliminating the crawling dot illusion in the sequential dot interlace system is proposed in the aforesaid Smierciak patent. In that system, the number of elements in each line is alternated in successive frames so that in each successive frame, the dots appear to be moving in the opposite direction, thus creating a net zero displacement of the dots over a period of two frames. That system was, however, characterized by considerable complexity.

It was a further requirement of the system and method of the aforesaid patent that the dot interlace ratio $n_2$ be divisible into the number of elements $E$ and in a line by an integer greater than one with an integer remainder, that the number of lines $L$in a frame, the number of picture elements or clock pulses in a line, and the remainder integer be of one numerical quality, i.e. odd or even, and that the dot interlace ratio $n_2$ be of the other numerical quality. Thus, for interlacing to take place, with an odd number of lines $L$ in a frame, the number of picture elements $E$ in a line would also be necessarily be odd, the remainder integer would be odd, and the dot interlace ratio $n_2$ would be even. In that system and method, the remainder integer determines the direction and nature of the dot-crawling illusion in the display and thus alternating the remainder integer from one frame to the next eliminated the dot-crawling illusion. An advantage of the system of the aforesaid Smierciak application is the capability of merely adding the system to existing conventional camera and monitor systems without requiring any modification of the sweep circuitry.

Certain other prior dot interlace systems, such as that disclosed in U.S. Pat. No. 3,309,461 to S. Deutsch, have utilized a pseudo-random selection of dots for transmission in each frame, and have thus eliminated the dot crawling illusion in the display. The system of the Deutsch patent, however, is characterized by great complexity and cannot merely be added to existing conventional camera and monitor systems without modification of the sweep circuitry.

SUMMARY OF THE INVENTION

The system of the present invention utilizes the "quasi" line principle of the aforesaid Smierciak patent in order to insure stable dot interlacing of images, in conjunction with a pseudo-random dot interlace scanning which eliminates the most objectionable aspect of prior dot interlace systems, i.e. the dot-crawling illusion. This is accomplished, in accordance with the invention, not by control of the deflection of the electron beam in the camera and monitor, as in the case of the system of the Deutsch patent, but rather by control of the sampling of the normally scanned video signal. More particularly, the net dot excursion from a given reference point is made equal to zero in both the horizontal and vertical direction by controlling the starting point of the sequential dot interlace in each frame. Once the starting point has been selected for a given frame, the interlace proceeds from line-to-line and field-to-field in exactly the same manner as the sequential dot system of the aforesaid Smierciak patent.

Thus, in accordance with the broader aspects of the invention, a pseudo-random dot, raster-type television system is provided including input circuit means for receiving a time-based video signal having recurrent line and frame synchronizing signals. Means are provided for generating a train of recurrent sampling signals in response to each of one of the line and frame synchronizing signals, each of the trains of sampling signals having frequency $f_e=f_v(LE)/nn_2$ where $f_v$ is the frequency of the frame synchronizing signals, $L$ is the number of lines in one frame, $E$ is a predetermined number of picture elements in one line, $n_1$is the vertical interlace ratio (if any) and $n_2$ is a predetermined dot interlace ratio, the quotient $LE/N_nn_2$ irreducible.

Means are provided responsive to each of the frame synchronizing signals for establishing, in a predetermined sequence, a different one of $n_2$phase relationships of the sampling signal trains with respect to the respective one synchronizing signal, the sequence repeating each $n_2$frames. Output circuit means are provided and means are provided for coupling the output and input circuit means in response to the sampling signals.

It is an object of the invention to provide an improved pseudo-random dot interlaced television system.

Another object of the invention is to provide an improved pseudo-random dot interlaced television system usable with conventional camera and monitor tubes without modification of the deflection circuitry thereof.

The above-mentioned and other features and objects of the invention and the manner of attaining them will become more apparent and the invention itself will be best understood by reference to the following description of an embodiment of the invention taken in conjunction with the accompanied drawings, wherein: BRIEF DESCRIPTION OF THE DRAWINGS FIG. 1 is a schematic block diagram showing a transmitting station incorporating the preferred embodiment of the pseudo-random dot interlaced television system of the invention;

FIG. 2A through E are timing diagrams useful in explaining the "quasi" line principle employed in the present invention;

Figure 1:
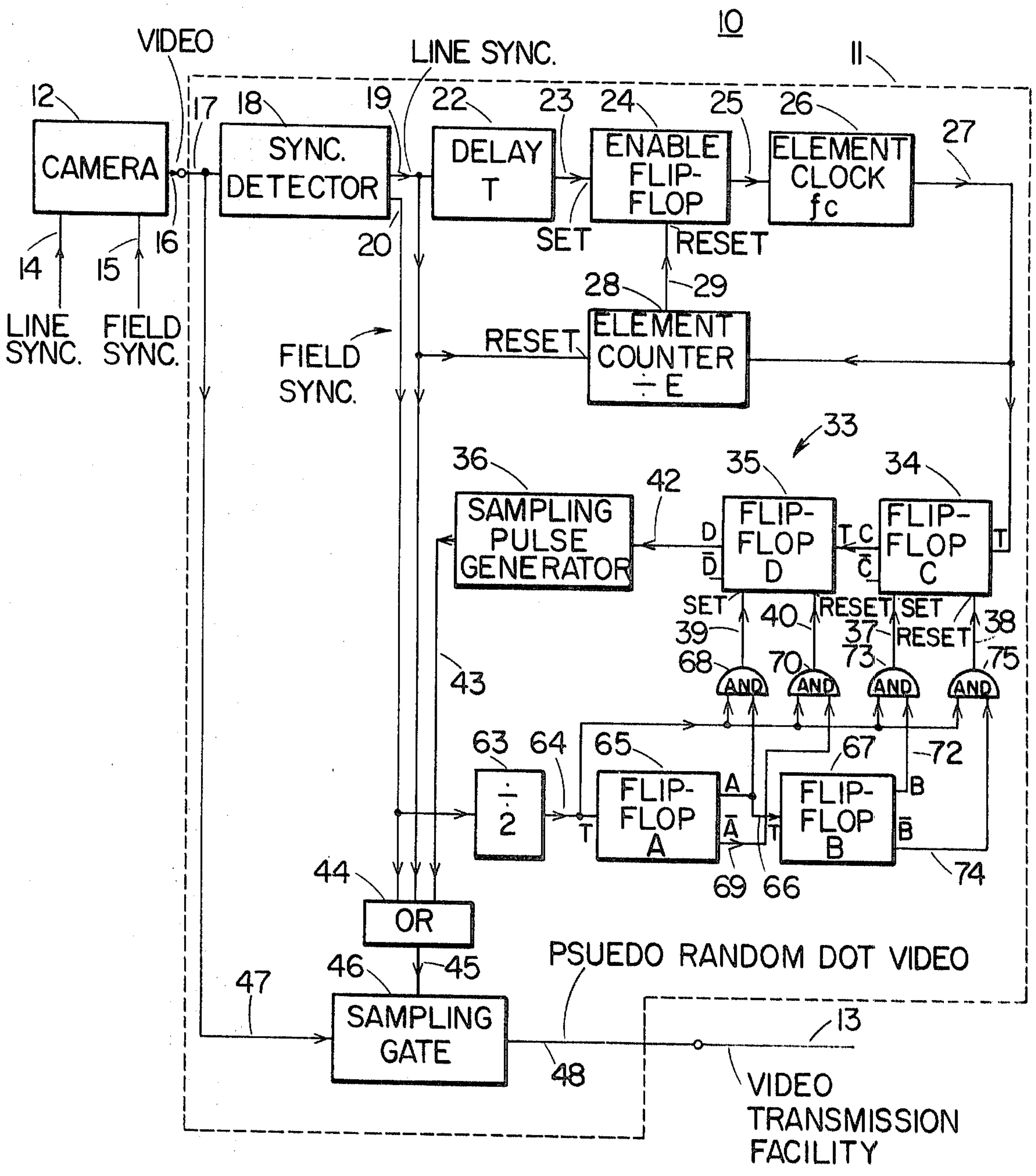
Figure 6:
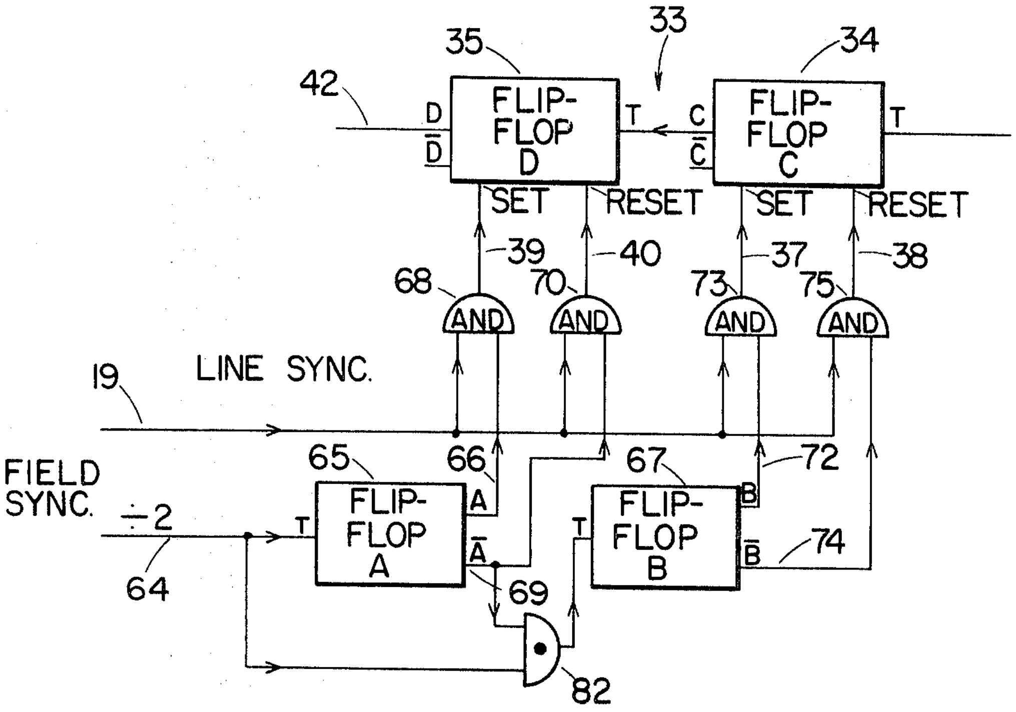
Figure 7:
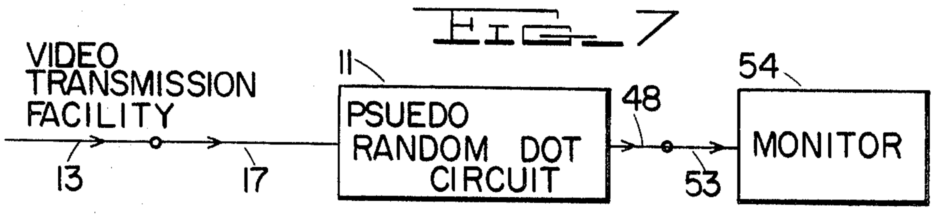

FIG. 5A through G are timing diagrams useful in explaining the mode of operation of the system of FIG. 1;

FIG. 6 is a fragmentary schematic block diagram showing another embodiment of the pseudo-random dot interlace system of the invention;

FIG. 7 is a schematic block diagram showing the receiving station employed with the transmitting stations of FIGS. 1 or 6; and FIG. 8A through C are timing diagrams useful in explaining the mode of operation of the receiving station of FIG. 7

DESCRIPTION OF THE PREFERRED EMBODIMENTS

Referring now to FIG. 1, there is shown a transmitting station, generally indicated at 10, incorporating one embodiment of the pseudo-random dot interlace system of the invention, shown within the dashed-line box 11. The interlace system 11 may be connected between conventional camera apparatus 12 and a conventional transmission facility 13 which, however, may have a narrower bandwidth capability than would otherwise be required, no modification in either the camera apparatus 12 of the transmission facility 13 being necessitated. The camera apparatus 12 includes conventional line and field-synchronizing signal sources 14 and 15 and a video signal output circuit 16. In the illustrated embodiment, the camera apparatus 12 provides a conventional 2:1 vertical interlace ratio.

The pseudo-random dot interlace system 11 of the invention includes an input circuit 17 coupled to the video signal output circuit 16 of the camera apparatus 12. A conventional sync. detector and separator circuit 18 is provided coupled to the input circuit 17 and having an output circuit 19 for the separated line synchronizing pulses and an input circuit 20 for the separated field synchronizing pulses. It will be readily understood that if the interlace system 11 is located on or immediately adjacent the camera apparatus 12, the sync. detector and separator circuit 18 may be eliminated and lines 19 and 20 directly coupled to the line and field-synchronizing pulse sources 14 and 15.

The line sync. pulse output circuit 19 is coupled to a conventional delay circuit 22, which may be a conventional monostable multivibrator which generates a time delay pulse having a duration T in response to the detected line sync. pulse, the delay pulse terminating, after termination of the respective lines sync. pulse. Output circuit 23 of the delay circuit 22 is coupled to the "set" circuit of a conventional enable flip-flop circuit 24 which generates an enabling signal in its output circuit 25. Output circuit 25 of the enable flip-flop circuit 24 is coupled to clock pulse generator 26, the enabling signal actuating the clock pulse generator to initiate generation of a train of clock pulses of frequency $f_c$.

The clock pulses generated by the clock pulse generator 26 appear in its output circuit 27 which is coupled to a conventional pulse counting circuit 28, which counts down the clock pulses and provides a signal in its output circuit 29 in response to the desired number E of clock pulses. Output circuit 29 of the element counter 28 is coupled to the "reset" circuit of the enabled flip-flop 24 thereby terminating the enabling signal and stopping the element clock 26.

Referring briefly to FIG. 2A and B, appearance of a line sync. pulse 30–1 in output circuit 19 of sync. detector 18 results in generation of a delay pulse of duration T by the delay circuit 22, termination of the delay pulse at the conclusion of the delay T setting the enable flip-flop 24 to actuate the element clock 26 and in turn to initiate generation of the clock pulses 32. Clock pulses 32 are counted by the element counter 28 when the E pulses 32 have been so counted, element counter 28 generates a reset pulse in its output circuit 29 which resets the enable flip-flop to terminate the enable signal and stop the element clock 26. It will thus be seen that the frequency $f_c$of the clock pulses 32 generated by the element clock 26 must be such that E clock pulses will be generated between termination of the delay T and initiation of the next line sync. pulse 30–2. Generation of E clock pulses 32 during one line thus establishes the "quasi" line of fixed duration. The element counter 28 is preset by the respective line synchronizing pulse 30 at the beginning of each line, the line sync. output circuit 19 of the sync. detector 18 being coupled to the "reset" circuit of the element counter.

Output circuit 27 of the clock pulse generator 26 is also coupled to interlace counter 33. In the illustrated embodiment in which the dot interlace ratio $n_2$is four, interlace counter 33 comprises two conventional bistable multivibrators or flip-flops 34, 35 coupled in a bistable counting chain with output circuit 27 coupled to the trigger circuit of flip-flop 34, the "one" output of flip-flop 34 coupled to the trigger circuit of, flip-flop 35, and the "one" output of flip-flop 35 coupled to a sampling pulse generator 36. Flip-flop 34 is provided with "-set" and "reset" circuits 37 and 38, and flip-flop 35 is provided with "set" and "reset" circuits 39 and 40, by which the interlace counter 33 may be preset to a predetermined initial count as will be hereinafter described.

Interlace counter 33 counts down the clock pulses 32 and provides an output pulse in its output circuit 42 in response to each predetermined number clock pulses in accordance with the dot interlace ratio $n_2$ desired, i.e. four in the illustrated embodiment. Conventional sampling pulse generator 36 provides in its output circuit 43 a narrow sampling pulse in response to each output pulse provided by the interlace counter 33.

The line sync. output circuit 19, the field sync. circuit 20 and the output circuit 43 of the sampling pulse generator 36 are coupled to a conventional "OR" circuit 44 which has its output circuit 45 coupled to gating circuit of a conventional sampling gate 46. The video signal input circuit 17 is coupled to the input circuit 47 of the sampling gate 46 which has its output circuit 48 coupled to the transmission facility 13. Sampling gate 46 is normally gated "OFF," being gated "ON" by the line and field synchronizing pulses, respectively, and by the sampling pulses provided by the sampling pulse generator 36. Thus, the video signal passed from the camera apparatus to the video transmission facility 13 by the sampling gate 46 between the line synchronizing pulse 30 consists of a train of sampled video signal pulses, there being only one such sampled video signal pulse for each $n_2$ clock pulses 32, i.e. four in the illustrated embodiment.

Figure 2:
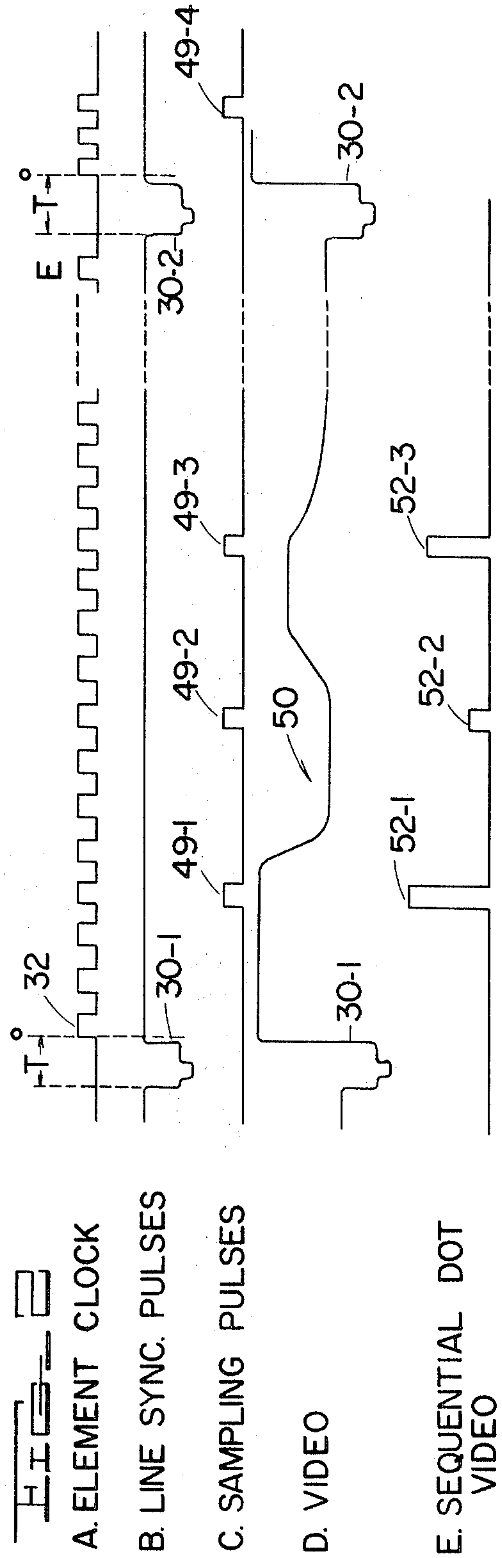

Referring now again briefly to FIG. 2 and assuming that the interlace counter 33 has been preset to have a zero initial count therein, as will be hereinafter described, and further assuming that $E$ is such as to provide a remainder of three, as would be the case where $E$=383 and $n_2$ =4, and finally assuming that the interlace counter 33 is not reset at the end of each line, it will be seen that sampling pulses 49 are generated in response to every fourth clock pulse 32, cumulatively from time T to the end of the line. Assuming now a video signal 50 as shown in FIG. 2D, it will be seen that sampled video signal pulses 52 are provided in the output circuit 48 of the sampling gate 46 and in the video transmission facility 13 respectively in response to the sampling pulses 49, each sampled video signal pulse 52 having the same amplitude as the respective segment of the video signal 50.

Except for the resetting capability of the interlace counter 33, the system and mode of operation above-described is that described in the aforesaid Smierciak patent. However, in that application, the interlace counter was of the nonreset type and thus counted down the clock pulses cumulatively from line-to-line and frame-to-frame.

Figure 8:
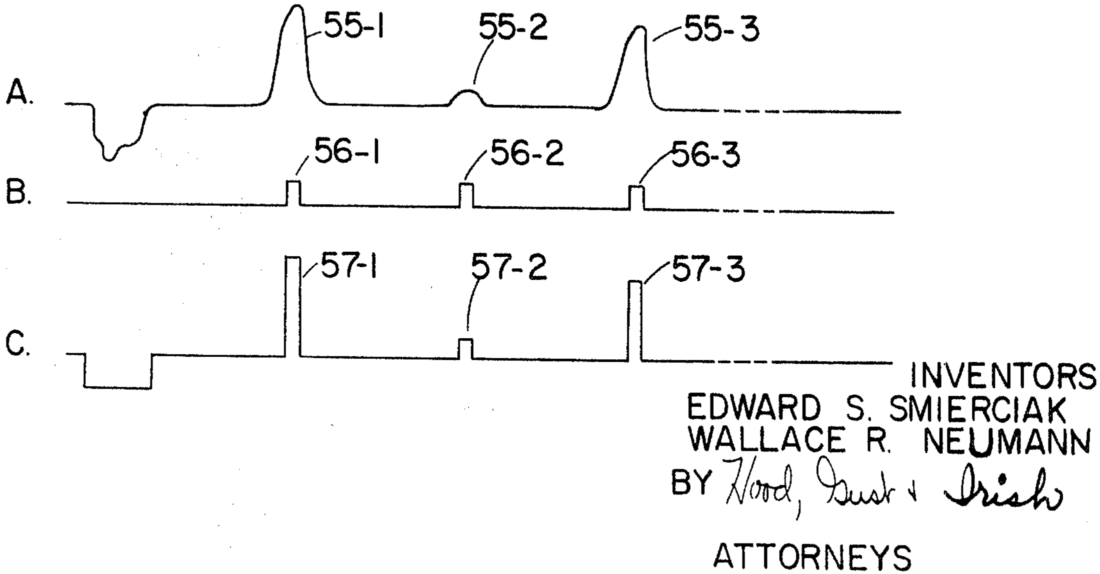

Referring briefly to FIG. 7, if the transmission facility 13 has sufficiently wideband characteristics so that the narrow sampled video signal pulses 52 are not unduly distorted during transmission, the receiving end of the transmission facility 13 may be directly coupled to the input circuit 53 of a conventional monitor 54 which will thus reconstruct the dot pattern, line-by-line and frame-by-frame, to provide a complete display image. Referring now additionally to FIG. 8, if the transmission facility 13 has narrow band pass characteristics, as is permitted with the dot interlaced system, the received video signal pulses 55 will be distorted, as shown in FIG. 8A. This condition can be corrected by merely resampling the distorted video signal pulses 55 by another dot interlace system 11 identical to that shown within the dashed line box in FIG. 1, having its input circuit 17 coupled to the receiving end of the transmission facility 13 and its output circuit 48 coupled to the input circuit 53 of the monitor 54. With this arrangement, sampling pulses 56 are provided, as shown in FIG. 8B, which resample the distorted, received video signal pulses 55 to provide narrow video signal pulses 57 which are displayed by the monitor 54.

Figure 3:
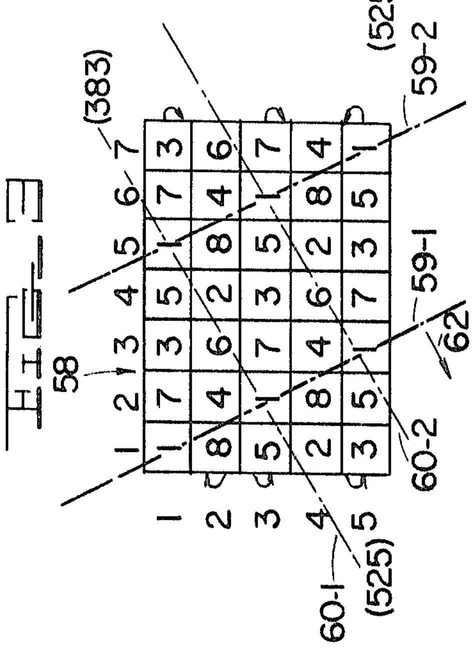
FIG. 3 is a diagram showing a simplified five-line by seven-element television image with a 2:1 video interlace ratio and a 4:1 sequential dot interlace ratio useful in explaining the dot creeping illusion.

Referring now to FIG. 3, there is shown a simplified five line by seven element diagram of the display provided by the system of the aforesaid Smierciak application, which could be the bottom right-hand corner of a conventional 525 line by 383 element display. In the case of a dot interlace ratio of 4:1, this would provide a remainder of three, as above-described. With a 2:1 vertical interlace ratio, it will be seen that the scanning beam of both the camera tube and the display tube starts its scan on the first element of the first line, scanning horizontally to the seventh element, the beam then scanning horizontally across lines three and five, and then returning to scan lines two and four, in accordance with the conventional vertical interlace system employed in broadcast television. In FIG. 3, the particular dots or elements in each frame which are displayed during each field are indicated by the corresponding numeral. Thus, during the first field, the first and fifth elements of the first line are transmitted and displayed, followed by the second and sixth elements of the third line and the third and seventh elements of the fifth line. During the second field, the fourth element of the second line followed by the first and fifth elements of the fourth line are transmitted, received and displayed. It will thus be seen that after eight complete fields, i.e. four complete frames, all of the video elements have been transmitted, received and displayed. Thus, considering the first line of the displayed image, the first and fifth elements were transmitted during the first field, the second and sixth during the seventh field, the third and seventh during the third field, and the fourth during the fifth field. Likewise, during the second line, the first and fifth elements were transmitted during the eighth field, the second and sixth during the fourth field, the third and seventh during the sixth field, and the fourth during the second field.

It will further be seen by reference to FIG. 3 that a repetitive two-line by four-element block pattern of dots sequentially displayed during all eight fields is developed, as shown at 58 in FIG. 3, these patterns being displaced one element to the right as the scanning proceeds downwardly. It will now be seen that with a seven element line, a dot interlace ratio of four, and with a remainder of three, with the system and method of the aforesaid Smierciak application, the elements sampled in the first field fall on two straight diagonal lines indicated by the heavy dashed line 59, extending from top left to bottom right. The elements sampled during the first field also fall on two other straight diagonal lines, indicated by the light-dashed line 60 extending from top right to bottom left. However, it will be seen that the elements scanned in the first field are spaced more closely together along the diagonal lines 59 than they are along the diagonal lines 60, i.e. the net dot displacement is greater along the diagonal line 60 than along the diagonal lines 59. It will be readily understood that the elements displayed in successive frames similarly fall along oppositely extending diagonal lines having the same pattern as the diagonal lines 59 and 60. By reason of this difference in the dot displacement along the diagonal lines 59 as opposed to the diagonal lines 60, the diagonal dot structure along the lines 59 is emphasized thus creating the dot crawling illusion, the lines seeming to crawl in the direction shown by the arrow 62 in the arrangement shown in FIG. 3.

It will now be seen that if the block patterns 58 are shifted so that the displacement between the elements falling along the diagonals 59 is equal to a displacement of the same elements falling along the diagonals 60, the emphasis upon the diagonal structure in the one direction would be eliminated.

In accordance with the present invention, this shaft of the dot patterns 58 is accomplished by presetting the initial count of the interlace counter 33 each frame. Referring again to FIG. 1, the field sync. output circuit 20 is coupled to a conventional dividing circuit 63 which divides the field sync. pulses by two to provide frame sync. pulses in its output circuit 64. Output circuit 64 of the dividing circuit 63 is coupled to the trigger circuit of a conventional bistable multivibrator or flip-flop 65 which has its "one" output circuit 66 coupled to the trigger circuit of a second bistable multivibrator or flip-flop 67. The flip-flops 65 and 67 are thus coupled in a conventional bistable counting chain and thus count-down the frame sync. pulses by $n_2$ i.e. four. The "one" output circuit 66 of flip-flop 65 and output circuit 64 of the dividing circuit 63 are coupled by a conventional AND gate 68 to the "set" circuit 39 of flip-flop 35 of the interlace counter 33. The "zero" output circuit 69 of flip-flop 65 and output circuit 64 are coupled by AND gate 70 to the "reset" circuit 40 of flip-flop 35. The "one" output circuit 72 of flip-flop 67 along with output circuit 64 of divider 63 is coupled by AND gate 33 to the "set" circuit 37 of flip-flop 34, and the "zero" output circuit 74 of flip-flop 67 along with output circuit 64 is coupled by AND gate 75 to the "reset" circuit 38 of flip-flop 34.

Figure 4:
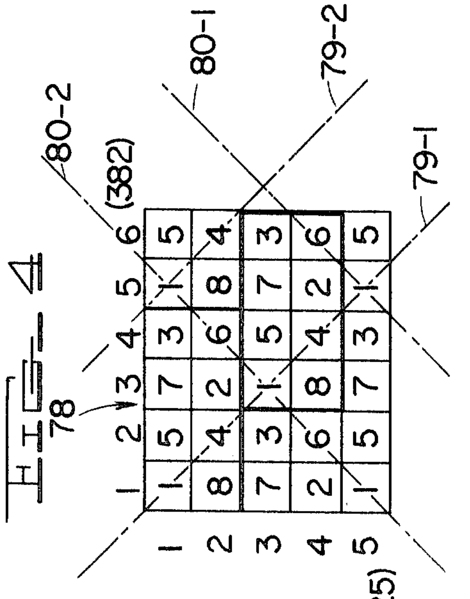
FIG. 4 is a diagram showing another simplified five-line by six-element television image with a 2:1 vertical interlace ratio and a 4:1 sequential dot interlace ratio provided by the system of FIG. 1 and useful in explaining the mode of operation of the system of FIG. 1.
Figure 5:
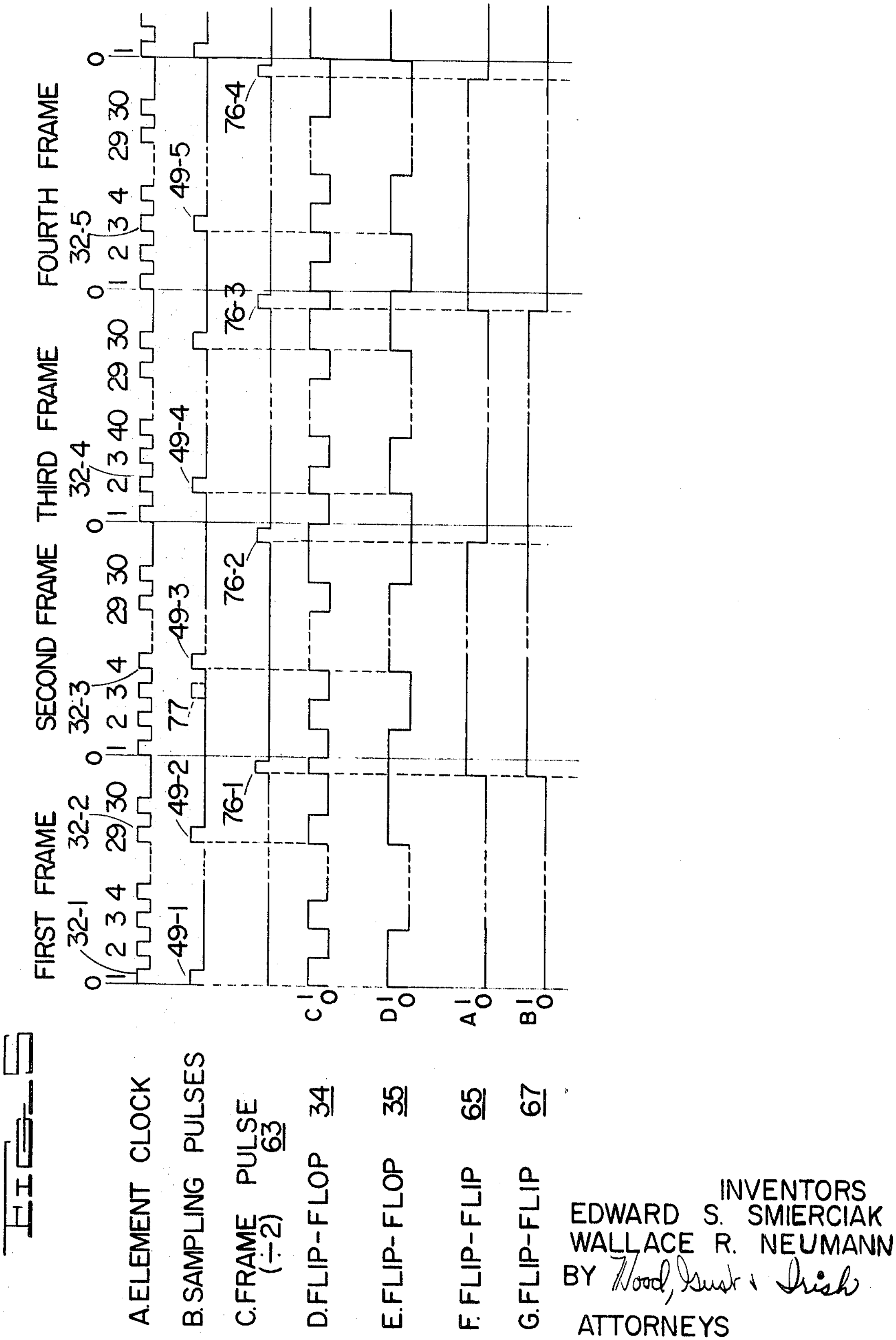

Referring now additionally to FIG. 5, the arrangement shown at FIG. 1 is such as to provide a remainder of two with a dot interlace ratio $n_2$ of 4:1. This would then provide a five line by six element diagram, as shown in FIG. 4 which would be found at the bottom right hand corner of a 525 line by 382 element display, with $E$ thus being 382. However, for purposes of simplicity, $E$ is shown in FIG. 5 as being 30 to correspond with the simple five line by six element display of FIG. 4.

The clock pulses 32 generated by the clock pulse generator 26 during the first, second, third and fourth frames (eight fields) are shown in FIG. 5A. With the arrangement shown in FIG. 1, flip-flop 35 (D) is "set" to the condition appearing on the "one" output circuit 66 of flip-flop 65 (A) while flip-flop 34 (C) is "set" to the condition appearing on the "one" output circuit 72 of flip-flop 67 (B). It is here assumed that immediately prior to the beginning of the first frame, the "one" outputs of flip-flops 65 and 67 (AB) are zero as shown in FIG. 5F and G. Thus, the frame pulse provided by the dividing circuit 63 immediately prior to the first frame will have "set" flip-flop 34 (C) and flip-flop 35 (D) to their zero states, as shown in FIG. 5D and E. With this initial preset condition of flip-flops 34 and 35, appearance of the first clock pulse 32–1 in the first frame will trigger flip-flop 34 to the "one" condition, thus in turn, triggering flip-flop 35 to the "one" condition thereby to generate sampling pulse 49–1 coincident with the first clock pulse 32–1. Thus, in this condition, the interlace counter 33 is initially preset with a count of "three" therein so that the next clock pulse 32 received thereby i.e. 32–1 produces an output sampling pulse 49–1.

The sampling operation then proceeds through the first frame in the same manner as the sequential dot interlace system of the aforesaid Smierciak application, it being observed that a sampling pulse 49–2 will be generated by the interlace counter 33 in response to the 29th clock pulse 32–2, frame pulse 76–1 then appears in the output circuit 64 of the dividing circuit 63 following the 30th clock pulse 32 of the first frame which when applied to flip-flop 65, causes its "one" output 66 to transition from "zero" to "one," and in turn causing the "one" output 72 of flip-flop 67 to transition from"zero" to the "one," as shown in FIG. 5F and G. Transition of the "one" output 72 of flip-flop 67 to "one" resets flip-flop 34 from "zero" to "one," as shown in FIG. 5D. However, flip-flop 35 is already in the "one" state and thus transition of the output 66 of flip-flop 65 from "zero" to "one" does not affect the output of flip-flop 35, as shown in FIG. 5E. The result of this resetting of flip-flop 34 is to preset the interlace counter 33 to an initial count of "zero" so that a sampling pulse 49–3 is not generated until generation of the fourth clock pulse 32–3. This is in contrast with the condition which would have prevailed had the interlace counter not been reset as in the aforesaid Smierciak application in which a sampling pulse would have been generated in response to the third clock pulse of the second frame, as shown in dashed lines at 77.

At the end of the second frame, frame pulse 76–2 triggers flip-flop 65 to its "zero" state with flip-flop 67 remaining in its "one" state. However, flip-flop 35 (which follows flip-flop 65) and flip-flop 34 (which follows flip-flop 67) are already in their "zero" and "one" states, respectively, so that neither flip-flop 34 or flip-flop 35 is reset by appearance of the frame pulse 67–2. Under this condition, the interlace counter 33 will continue its normal cumulative count-down of the clock pulses resulting in generation of sampling pulse 49–4 in response to the second clock pulse 32–4 of the third frame.

At the end of the third frame, frame pulse 76–3 causes flip-flop 65 to transition to its "one" and flip-flop 67 to transition to its "zero" in turn causing flip-flop 34 to transition to its "-zero" state and thus presetting the interlace counter 33 to an initial count of "one," so that a sampling pulse 49–5 is generated in response to the third clock pulse 32–5 of the fourth frame. Finally, generation of frame sync. pulse 76–4 a the end of the fourth frame causes flip-flop 65 to transition to its "zero" state thus returning to the condition which prevailed immediately prior to the start of the first frame, as above described.

It will now be seen that the provision of the flip-flops 65 and 67 for resetting the flip-flop 35 and 34, respectively, of the interlace counter 33 at the beginning of each frame permits rearrangement of the dot pattern of the display in a pseudo-random manner in order to provide a net zero dot displacement so as to eliminate the dot-crawling illusion.

Referring now again to FIG. 4, with the arrangement shown in FIG. 1, it will be seen that during the first field, the first and fifth elements are transmitted and displayed in the first line, the third element in the third line, and the first and fifth elements again in the fifth line. Likewise, in the second field, the fourth element is transmitted and displayed in the second line and the first and fifth elements transmitted and displayed in the fourth line. It will now be seen that this dot pattern results in the provision of basic two-line by four-element blocks 78 which are now displaced by two elements rather than by one element, as in the case of FIG. 3. Further, it will be seen that the elements displayed during the first field fall along first diagonal lines 79–1 and 79–2 which extend from top left to bottom right, and along second diagonal lines 80–1 and 80–2 which extend from top right to bottom left. Most importantly, it will be seen that the displacement between the elements falling along the diagonal lines 79–1 and 79–2 is exactly equal to the displacement of the elements falling along the lines 80–1 and 80–2. Thus, there is no emphasis upon the diagonal dot structure in either direction.

The above described pseudo-random technique eliminates the crawling illusion by making the net horizontal and vertical displacement of an element within the eight element block of FIG. 3 equal to zero. The elimination of the diagonal structure by alternating the remainder of elements in the quasiline further enhances the image by better displaying the eight element blocks and not the individual element location. The individual element locations are under the control of the flip-flops 65 and 67, and it is this control which determines the pseudo-random sequences to eliminate the crawling illusion.

It will now be seen that the interlace counter 33 is preset at the beginning of each frame, in a predetermined sequence, to a different predetermined initial count the sequence repeating each $n_2$frames. It will further be seen that the predetermined sequence of predetermined initial counts can be changed by rearrangement of the connections of the "one" and "zero" outputs of the flip-flops 65 and 67 to the "set" and "reset" circuits of the flip-flops 34 and 35. It has been found, however, that the particular connection shown in FIG. 1, which provides the pseudo-random dot pattern shown on FIG. 4, provides a particularly pleasing display with a remainder of two and with a dot interlace ratio ($n_2$) of 4:1, there being absolutely no dot crawling illusion provided with this arrangement.

It will further be seen that with the pseudo-random dot arrangement of the invention, it is no longer required that an odd integer remainder be employed with an odd number of lines since with the arrangement of the invention, complete latitude in the choice of an odd or even integer remainder is available in order to provide the most pleasing display. Further, it is no longer a requirement that the dot interlace ratio $n_2$ be even when the number of lines is odd, or vice versa since with the pseudo-random dot system of the invention, the dot interlace ratio can be either odd or even without regard to the odd or even character of the number of lines.

It will be readily apparent that in the case of higher dot interlace ratios ($n_2$), a correspondingly higher number of flip-flops will be required in the interlace counter chain 33 and a correspondingly higher number of flip-flops in the resetting counting chain.

Referring now to FIG. 6, with certain remainders and dot interlace ratios, it may be desirable not only to reset the flip-flops of the interlace counter chain 33 each frame, but also to reset the interlace counter flip-flops at each line to the initial preset count which prevails during a complete frame. While in FIG. 6 for the purpose of simplicity, only two interlace counter flip-flops 34 and 35 and two resetting flip-flops 65 and 67 are shown, thus indicating a dot interlace ratio of 4:1, the arrangement in FIG. 6 may find utility in the case of higher interlace ratios. Here, with like elements being indicated by like reference numerals, the line sync. output circuit 19 is coupled to the AND gates 68, 70, 73 and 75, thus resetting the interlace counter flip-flops 34 and 35 in response to each line sync. pulse, the flip-flops 34 and 35 being so reset during each frame to the initial preset count established by the stable conditions of the flip-flops 65 and 67 which prevail during a particular frame. To further illustrate the different permutations which are possible, in the embodiment of FIG. 6, the "zero" output 69 of flip-flops 65 along with the output circuit 64 of the dividing circuit 63 are coupled by AND gate 82 to the trigger circuit of flip-flop 67. This arrangement produces a phase displacement between the "one" outputs 66 and 72 of the flip-flops 65 and 67 respectively applied to the AND gates 68 and 73.

It will be understood that the interlace counter flip-flops may alternatively be reset each field, rather than each frame, as suggested by the dashed line 71 in FIG. 6.

It will now be seen that in accordance with the invention, the state of the interlace counter flip-flops determines which element is first sampled in the first line of each frame (or in each line in the case of FIG. 6) which, in turn, determines the pseudo-random pattern of dots on the screen. It will be seen that by merely changing the connection of the output leads of the resetting flip-flops 65 and 67, different starting conditions can be determined which will provide different pseudo-random dot patterns.

While there have been described above the principles of this invention in connection with specific apparatus, it is to be clearly understood that this description is made only by way of example and not as a limitation to the scope of the invention.

We claim:

1. In a raster-type television system including means for generating a time-based dot interlaced video signal having recurrent line-synchronizing signals and frame-synchronizing signals, a pseudo-random dot interlace sampling system comprising:

means for generating a train of timing signal pulses in response to the line synchronizing signals;

means for generating a train of recurrent sampling signal pulses having the frequency $f_e = f_r(LE/n_1 n_2)$, wherein $f_r$ is the frequency of the frame synchronizing signals, $L$ is the number of lines in one frame, $E$ is the number of picture elements in one line, $n_1$ is the vertical interlace ratio and $n_2$ is a predetermined dot interlace ratio, it being required that the quotient $LE/n_{n1}n_2$ be irreducible;

an interlace counter for actuating said sampling signal pulse generating means in response to each $n_2$ timing signal pulses;

means for setting said interlace counter to a different predetermined initial count of the timing signal pulses in response to each frame synchronizing signal, there being $n_2$ of such initial counts in a predetermined sequence, the sequence repeating each $n_2$frames; and gating means responsive to the sampling signal pulses for sampling and transmitting the sampled train of sequential dot interlaced video signals.

2. The system of claim 1 wherein said timing signal pulse generating means is adapted to generate said timing signal trains having a frequency $f_c = f_e n_2$, $f_c$ being such that there are E timing signal pulses generated during one line of the picture element, and means terminating each said timing signal train in response to E timing signal pulses.

3. The system of claim 2 wherein said setting means further comprises means for resetting said interlace counter to the same predetermined initial count in response to each said line-synchronizing signal during the same frame.

4. The system of claim 2 wherein said terminating means includes pulse-counting means for counting down said timing signal pulses and means for deactuating said timing signal pulse-generating means in response to each E timing signal pulses; said interlace counter includes a first plurality of bistable means providing a first bistable counting chain to count-down the pulses of said timing signal trains and for providing a said sampling signal in response to each $n_2$ timing signals, each of said first bistable means including means for setting the same to a predetermined state, said setting means includes a second plurality of bistable means equal in number to said first plurality providing a second bistable counting chain to count-down $n_2$ of said frame synchronizing signals, each of said second plurality of bistable means being coupled to a different one of said first plurality of bistable means for presetting said first counting chain to a different predetermined initial count in response to each said frame synchronizing signal.

5. The system of claim 4 wherein said interlace counter further comprises means coupled to said setting means for resetting said first counting chain to same predetermined initial count in response to each said line-synchronizing signal during the same frame.

6. The system of claim 4 wherein each of said first bistable means includes "set" and "reset" circuits, each of said second bistable means having "one" and "zero" output circuits, said interlace counter further comprising a plurality of "AND" function gates respectively coupling said second bistable means output circuits to different predetermined ones of said "set" and "reset" circuits, said gates being also coupled to receive one of said line and frame synchronizing signals.

7. The system of claim 6 wherein said video signal comprises recurrent field-synchronizing signals whereby every other field synchronizing signal is a said frame-synchronizing signal, including means for dividing said field-synchronizing signals by two to provide said frame-synchronizing signals, said second counting chain being coupled to said dividing means.

8. The system of claim 7 wherein said gates are coupled to receive said line synchronizing signals thereby to reset said first counting chain to the same predetermined initial count in response to each said line-synchronizing signal during the same frame.

9. The system of claim 7 wherein said gates are coupled to said dividing means to receive said frame-synchronizing signals whereby said first counting chain is reset once each frame.